May 23, 1944.　　　L. O. CARLSEN　　　2,349,537
WORK SUPPORT
Filed Aug. 11, 1942

Inventor
LEONARD O. CARLSEN
By
Attorney

Patented May 23, 1944

2,349,537

UNITED STATES PATENT OFFICE 2,349,537

WORK SUPPORT

Leonard O. Carlsen, Rochester, N. Y., assignor to Gleason Works, Rochester, N. Y., a corporation of New York Application August 11, 1942, Serial No. 454,406

3 Claims. (Cl. 90—59)

The present invention relates to work supporting means and particularly to work supporting means such as may be used for holding bored gears on gear-cutting, gear-testing, gear-lapping, gear-burnishing machines, and the like. In a more specific aspect, the invention relates to a work support of the type in which a single arbor is used with a series of removable bushings of different diameters to hold work-pieces having different sized bores, a bushing of a given external diameter being used with the arbor to hold a work-piece of a given bore diameter.

In cutting, testing, lapping, or burnishing gears, it is necessary to hold the work rigidly against rotation on its support; the support and gear must rotate together as a unit. This means that in a work support comprising an arbor and a removable bushing, the bushing must be held against rotation relative to the arbor during use, and the bushing itself must have quite a close fit in the bore of the work so that when the work is clamped on the support, the work will be held against rotation relative to the support. Because of the closeness of the fit of the bushing in the bore of the work, it sometimes happens that when the time comes to remove the work from the work support after completion of a particular operation, it is found that the work sticks, and when an attempt is made to slip the work off the bushing by turning it, work-piece and bushing tend to turn together.

Heretofore, the common practice has been to employ a set-screw to secure the bushing against rotation relative to the arbor. When a work-piece is mounted on the support, the set-screw is, of course, covered by the work and it is not accessible. If the work sticks, then, and force is applied in an effort to twist and turn it off the bushing, it is not infrequent for the set-screw to be broken. Then the operator is involved in a series of troubles. He has not merely a broken set-screw that has to be replaced. There is the difficulty of getting the broken set-screw out of the bushing and the arbor, and sometimes both bushing and arbor have to be scrapped because they are scored in the process of taking the bushing off of the arbor.

The primary object of the present invention is to provide a combined bushing and arbor structure in which the bushing can readily be removed from the arbor if the work sticks, without any possibility of damage either to the bushing or the arbor.

A further object of the invention is to provide a combined bushing and arbor structure which will have the foregoing advantages and which, in addition, will be relatively simple and inexpensive.

Other objects of the invention will be apparent hereinafter from the specification and from the recital of the appended claims.

In the work support of the present invention, arbor and bushing are connected together by a pin and bayonet slot connection. The slot is preferably formed in the arbor and the pin secured in the bushing. The leg part of the slot is disposed axially of the arbor and has its opening at the front end of the arbor. To put the bushing on the arbor, the pin is slipped into the leg of the slot, the bushing is moved axially rearwardly until the pin enters the transverse part of the slot and then the bushing is turned to lock the pin in the slot. To take the bushing off the arbor, the reverse of this movement is performed. To mount a work-piece on the support, the work-piece is simply pushed on over the bushing in the usual manner. To take the work-piece off, it is pulled off the bushing, in the usual manner. If the work-piece sticks on the bushing, then work-piece and bushing can be turned together until the pin in the bushing aligns with the leg of the bayonet slot in the arbor. Then work-piece and bushing can be taken off of the arbor together by simply drawing the pin forward in the leg of the slot. Then the work-piece can be removed from the bushing in any standard arbor press. The bushing can then be put back on the arbor and the work support is ready for use again. Nothing is broken, nothing damaged; and the whole operation of removal of a stubborn work-piece from a sticking bushing is a matter only of a few seconds.

Figure 1:
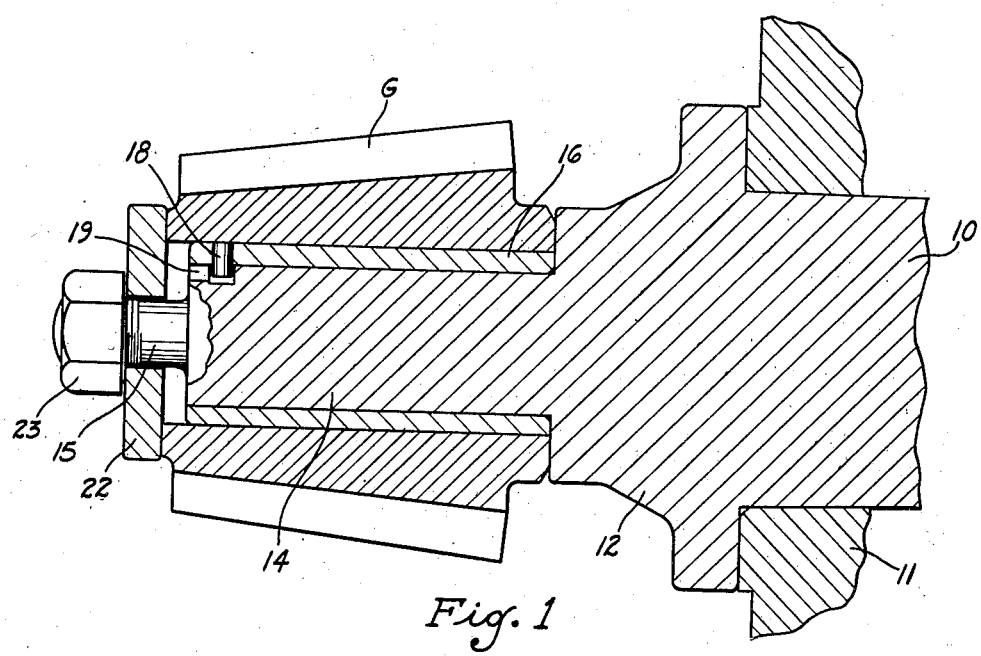
Fig. 1 is a sectional view of a work support constructed according to a preferred embodiment of this invention, and showing a bevel gear mounted thereon.
Figures 2, 3:
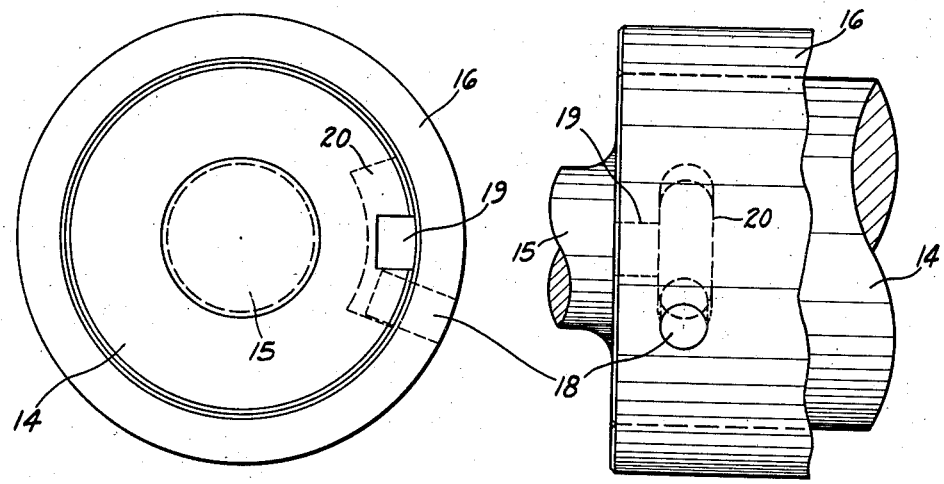
Fig. 2 is a front elevation of this support.
Fig. 3 is a fragmentary side elevational view thereof.

Reference will now be had to the drawing for a more detailed description of the invention.

10 denotes an arbor and 11 is the work spindle of the machine on which the novel work support of the present invention is used. The arbor is mounted in the bore of the work spindle and may be secured in the bore by any means usually employed for the purpose, as, for instance, a draw-bar (not shown). The nose portion 12 of the arbor projects beyond the front end of the work spindle and is formed with a reduced forwardly projecting stem-portion 14. The stem-portion 14 of the arbor is, in turn, formed with a forwardly projecting threaded stud 15. The stem-portion 14 of the arbor has a double bayonet or T-slot formed in its periphery. The leg 19 of this T-slot extends axially of the arbor and its open end is at the front end of the stem part of the arbor.

The bushing 16, which is adapted to cooperate with the arbor 10 to form the work support, is carried on the stem portion 14 of the arbor. For any particular job, the bushing 16 is selected to have an external diameter equal to or but slightly less than the internal diameter of the bore of the work-piece which is to be mounted on the work support. The bushing 16 has a pin 18 secured in it which is adapted to cooperate with the bayonet slot in the arbor to hold the bushing against rotation on the arbor.

To mount the bushing 16 on the arbor, the pin 18 is aligned with the leg portion 19 of the bayonet slot and the bushing is pushed axially rearwardly on the arbor until the pin 18 strikes the rear wall of the transverse portion 20 of the bayonet slot or until the bushing seats itself against the nose portion 12 of the arbor. Then, since the bayonet slot is a T-slot, the bushing may be turned either clockwise or counterclockwise and lock the bushing against axial movement relative to the arbor. To remove the bushing from the arbor, the bushing is turned until the pin 18 aligns with the leg portion 19 of the T-slot and it is then slid forward.

In placing a work-piece, as for instance the gear G, on the work support, its bore is slipped over the bushing 16 and the work piece is moved rearwardly. Ordinarily, because of the closeness of the fit, the operator will turn a gear slightly either clockwise or counterclockwise so as to assist him in readily pushing the work-piece over the bushing. Likewise, in removing the work-piece from the arbor, the gear will usually be turned either clockwise or counterclockwise as it is moved axially forward. The pin 18 will seat in one end or other of the transverse part 20 of the bayonet slot during the clockwise or counterclockwise movement of the gear, and after it seats, the gear may be turned on the bushing for positioning or removal without any further relative movement taking place between the bushing and the arbor.

The gear may be clamped on the arbor by a disc or washer 22 which is adapted to be slipped over the stud portion 15 of the arbor and which is held in clamping position by a nut 23 that threads onto the stud portion 15. The work seats against the nose portion of the arbor and the friction exerted between the nose portion 12 and the rear face of the work-piece on the one hand and between the front face of the work-piece and the clamping disc 22 on the other hand, after the nut 23 has been tightened up, serve with the friction between the bushing and the work-piece to hold the work against rotation as well as axial movement relative to the arbor.

Ordinarily all that is required to remove the work-piece from the arbor after the nut 23 and washer 22 have been removed, is to slip the work-piece forwardly while giving it a slight turning movement. If the work-piece sticks, however, and cannot be removed from the bushing by exertion of any ordinary force, then the operator simply turns the bushing 16 and the work-piece G together until the pin 18 aligns with the leg portion 19 of the T-slot in the arbor and pulls both gear and bushing together forwardly to remove both the gear and bushing together from the arbor. The gear can then be removed from the bushing in an ordinary arbor press, and the bushing can be slipped back over the arbor ready to be used with another work piece.

Various sizes of bushings can be used with a single arbor by simply slipping on to the arbor the bushing required to suit the bore diameter of a particular job and locking the bushing in place with the pin and T-slot connection. Thus by providing a series of bushings, a single arbor can be employed for a wide range of work and the expense of arbor equipment is kept at a minimum.

While a particular embodiment of the invention has been illustrated and a particular use therefor, it will be obvious that the invention is capable of further modification and use, and the present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a work support, an arbor and a bushing, said arbor being formed with a seat and with a stem portion projecting forwardly from said seat, said bushing being adapted to fit over the stem portion of the arbor and both said bushing and said arbor being adapted to enter the bore of a work-piece to support the same, one of said parts having a bayonet slot formed therein, the leg portion of which extends axially of the stem portion of the arbor and the open end of which lies at the front end of the arbor, the stem portion of the other of said parts having a pin secured thereto which is adapted to enter said slot to couple the bushing to the arbor, and means for holding a work-piece against the arbor seat after the work-piece has been positioned on the bushing.

2. In a work support of the combined arbor and bushing type for supporting a bored work-piece, an arbor having a seat portion and a stem portion projecting forwardly from said seat portion, a bushing adapted to be removably mounted on the stem portion of the arbor and having an external diameter suitable for entering the bore of the work-piece to support the same, said arbor having a bayonet slot formed in its periphery, the open end of which is at the front end of the arbor, said bushing having a pin secured thereto which projects internally from the bushing and is adapted to be engaged in said slot to releasably lock the bushing against axial movement relative to the arbor, and means for securing the work-piece against the arbor seat to hold it against axial movement relative to said bushing and arbor.

3. In a work support, an arbor and a bushing, said arbor being provided with a seat portion and with a stem portion of reduced diameter which projects forwardly from said seat portion, said bushing being removably carried by the stem portion of the arbor and being of a diameter to enter the bore of a work-piece to support the same, the stem portion of said arbor having a T-slot formed in its periphery, the leg portion of which extends axially of the arbor and the open end of which is at the front end of the stem portion of the arbor, said bushing having a pin secured thereto which projects internally from the bushing and which is adapted to enter said slot to couple the bushing and arbor, the stem portion of the arbor being threaded at its forward end, and clamping means threaded on said stem portion to secure a work piece against the arbor seat.

LEONARD O. CARLSEN.